US011786988B2

United States Patent
Pinder et al.

(10) Patent No.: US 11,786,988 B2
(45) Date of Patent: Oct. 17, 2023

(54) MACHINING HEAD AND METHOD FOR LASER MACHINING

(71) Applicant: BYSTRONIC LASER AG, Niederönz (CH)

(72) Inventors: Thomas Pinder, Dippoldiswalde (DE); Andreas Luedi, Burgdorf (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 18/002,624

(22) PCT Filed: Jun. 23, 2021

(86) PCT No.: PCT/EP2021/067144
§ 371 (c)(1),
(2) Date: Dec. 20, 2022

(87) PCT Pub. No.: WO2021/260003
PCT Pub. Date: Dec. 30, 2021

(65) Prior Publication Data
US 2023/0191530 A1    Jun. 22, 2023

(30) Foreign Application Priority Data

Jun. 25, 2020  (EP) .................................... 20182302

(51) Int. Cl.
*B23K 26/03*  (2006.01)
*B23K 26/06*  (2014.01)
*B23K 26/38*  (2014.01)

(52) U.S. Cl.
CPC ........ *B23K 26/032* (2013.01); *B23K 26/0643* (2013.01); *B23K 26/38* (2013.01)

(58) Field of Classification Search
CPC ... B23K 26/032; B23K 26/0643; B23K 26/38
(Continued)

(56) References Cited

U.S. PATENT DOCUMENTS 6,791,057 B1 *  9/2004  Kratzsch ................ B23K 26/24
                                                    219/121.62
7,804,043 B2 *  9/2010  Deshi ................. B23K 26/0624
                                                    219/121.72
(Continued)

FOREIGN PATENT DOCUMENTS

DE  102011119478 B4   1/2016
DE  102015121988 A1   6/2017
(Continued)

OTHER PUBLICATIONS

International Search Report and Written Opinion, dated Nov. 3, 2021, from PCT/EP2021/067144.
(Continued)

*Primary Examiner* — Jimmy Chou
(74) *Attorney, Agent, or Firm* — Workman Nydegger (57) ABSTRACT

A machining head for the laser machining of a workpiece. The machining head may include a first interface for a machining laser source for emitting a machining laser beam, a second interface for an illumination light source for emitting an illumination light beam, an exit opening for the machining laser beam and the illumination light beam, a third interface for a detector device for detecting the illumination light beam reflected from the workpiece, and guide optics for at least partial coaxial guiding of the emitted illumination light beam through the exit opening and of the illumination light beam reflected from the workpiece, through the exit opening, to the third interface. The guide optics have a polarising beam splitter for guiding at least part of the emitted illumination light beam in the direction of the exit opening, and a retardation plate between the polarising beam splitter and the exit opening.

20 Claims, 7 Drawing Sheets

(58) Field of Classification Search
USPC .................................................. 219/121.83
See application file for complete search history.

(56) References Cited

U.S. PATENT DOCUMENTS

| | | | |
|---|---|---|---|
| 9,427,823 B2 * | 8/2016 | Alfille | B23K 26/1437 |
| 9,517,533 B2 * | 12/2016 | Uchida | G01B 11/30 |
| 10,578,428 B2 * | 3/2020 | Strebel | G01B 9/02091 |
| 11,396,062 B2 * | 7/2022 | Moser | B23K 31/125 |
| 11,511,370 B2 * | 11/2022 | Sakurai | G01B 11/02 |
| 2006/0011592 A1 * | 1/2006 | Wang | B23K 26/034 |
| | | | 219/121.64 |
| 2006/0196860 A1 | 9/2006 | Verschueren | |
| 2011/0109911 A1 * | 5/2011 | Podoleanu | A61B 3/102 |
| | | | 356/451 |
| 2012/0138586 A1 * | 6/2012 | Webster | B23K 26/20 |
| | | | 219/121.64 |
| 2012/0285936 A1 * | 11/2012 | Urashima | G01B 9/02091 |
| | | | 219/121.63 |
| 2013/0043225 A1 * | 2/2013 | Schurmann | B23K 26/044 |
| | | | 219/121.64 |
| 2013/0068738 A1 * | 3/2013 | Schurmann | B23K 26/03 |
| | | | 219/121.72 |
| 2016/0039045 A1 * | 2/2016 | Webster | B23K 26/14 |
| | | | 356/450 |
| 2016/0059350 A1 * | 3/2016 | Schoenleber | B23K 26/04 |
| | | | 219/121.81 |
| 2016/0193692 A1 * | 7/2016 | Regaard | B23K 31/125 |
| | | | 219/121.62 |
| 2017/0043431 A1 * | 2/2017 | Kuba | B23K 26/032 |
| 2017/0120337 A1 * | 5/2017 | Kanko | B33Y 10/00 |
| 2020/0262004 A1 * | 8/2020 | Moser | B01D 1/0017 |

FOREIGN PATENT DOCUMENTS

| | | | | |
|---|---|---|---|---|
| DE | 102018205545 A1 | 10/2019 | | |
| EP | 2886239 A1 * | 6/2015 | ........... | B23K 26/032 |
| EP | 2886239 A1 | 6/2015 | | |

OTHER PUBLICATIONS

International Preliminary Report on Patentability, dated Oct. 11, 2020, from PCT/EP2021/067144.

* cited by examiner

MACHINING HEAD AND METHOD FOR LASER MACHINING

The present invention concerns a machining head for laser machining of a workpiece, in particular for laser cutting, according to claim 1, the use of such a machining head according to a further independent claim and a method for laser machining of a workpiece, in particular for laser cutting, in particular with a machining head, according to a further independent claim.

Process monitoring, i.e., the monitoring of a machining process, is becoming increasingly important for the laser machining of workpieces, in particular for laser cutting. Attempts have been made for some time to make the process light generated during cutting usable for monitoring and control purposes. For this purpose, the machining zone of the workpiece, also called the process zone, can be viewed in a spatially resolved manner by means of camera technology or another detector. This holds great potential for process analysis, since in addition to the process light intensity, geometric information, in particular about the kerf, can be obtained. However, not only can the process light be used to obtain geometric information, the process zone can additionally or alternatively be actively illuminated.

In the case of a machining head for laser machining, the machining laser beam and the illuminating light can be directed onto the workpiece through an exit opening. If the illuminating light reflected from the workpiece is detected with a camera inside the machining head, the illuminating light has to pass the exit opening twice, from the illumination light source to the process zone and back again in the direction of the camera. The exit opening can be relatively small depending on the type of laser machining. During laser cutting, for example, depending on the cutting process and the cutting gas used, an aperture in the exit opening of the machining head (also called a nozzle) can have a very small shutter diameter. In such a case, a very steep angle of incidence for the illuminating light is therefore desirable.

Figure 1:
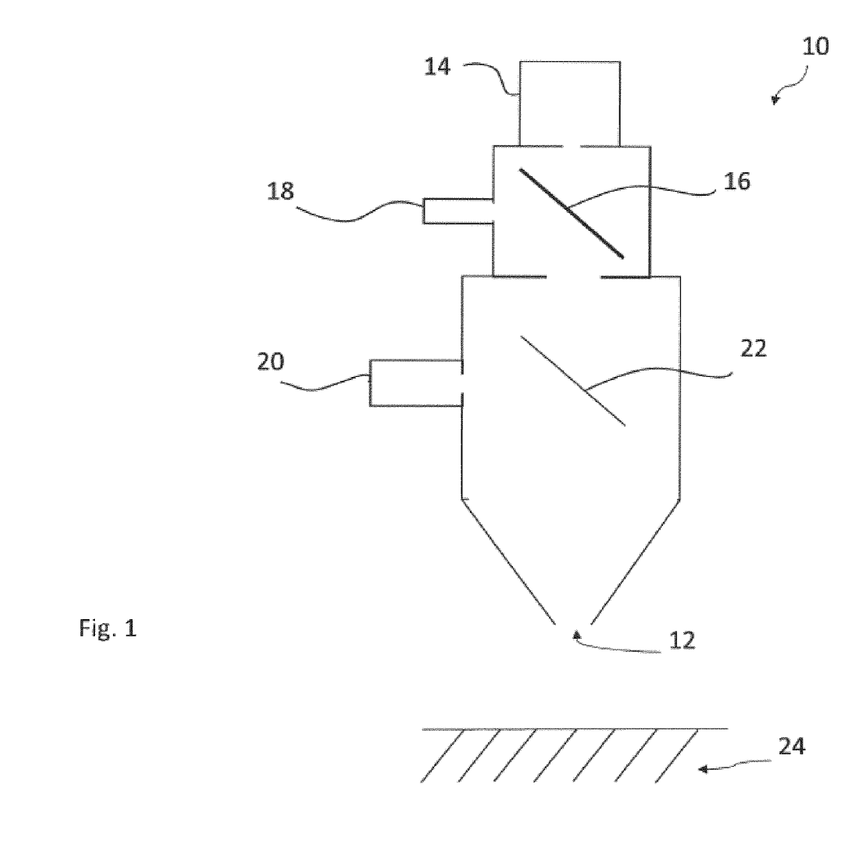
FIG. 1 schematically shows an exemplary known laser cutting head 10.

In the case of a machining head, the exit opening and the camera can be arranged coaxially. In addition, the machining laser beam and the illuminating laser beam can be guided coaxially onto the workpiece, for example via one or more coupling mirrors. FIG. 1 schematically shows a laser cutting head 10 with an exit opening 12, a camera 14 arranged to be coaxial with the exit opening, a beam splitter 16 for the illuminating light, an illumination light source 18, a machining laser source 20, a dichroic mirror 22 for deflecting the machining laser beam and a workpiece 24 to be processed.

Figure 2:
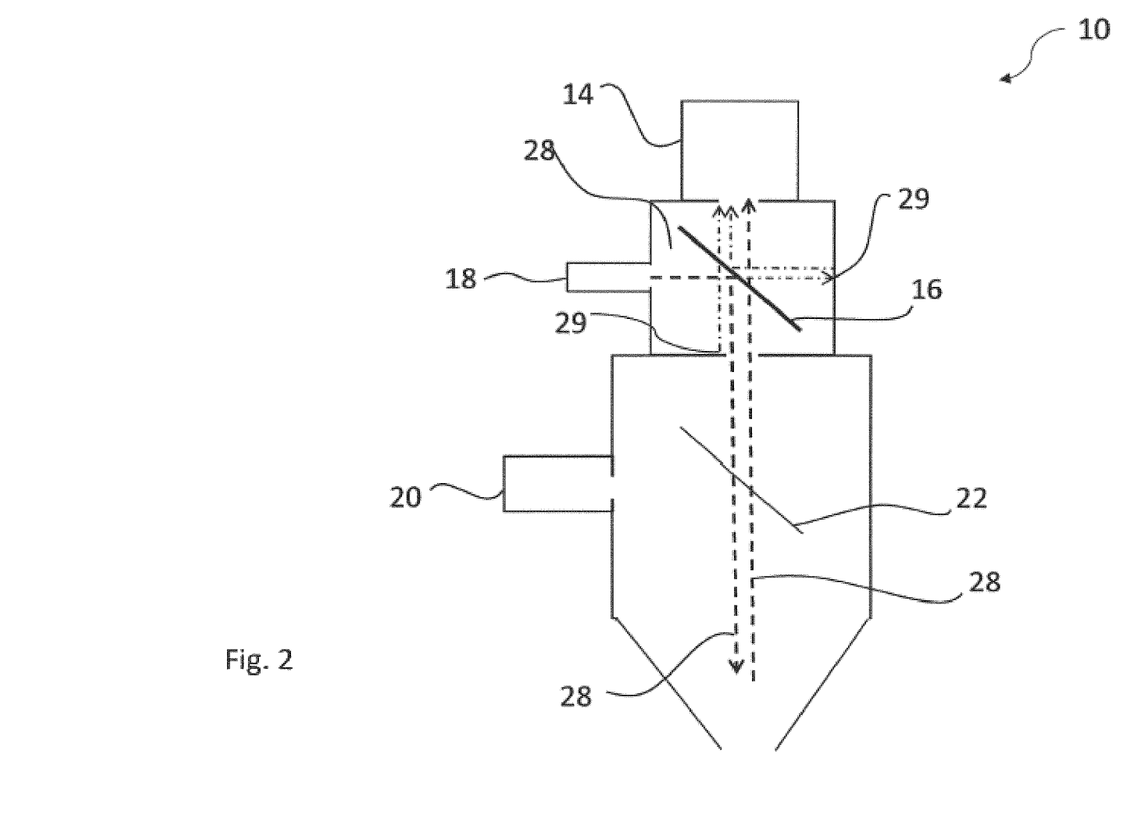
FIG. 2 schematically shows the laser cutting head 10 during operation of the illumination light source.
Figure 3:
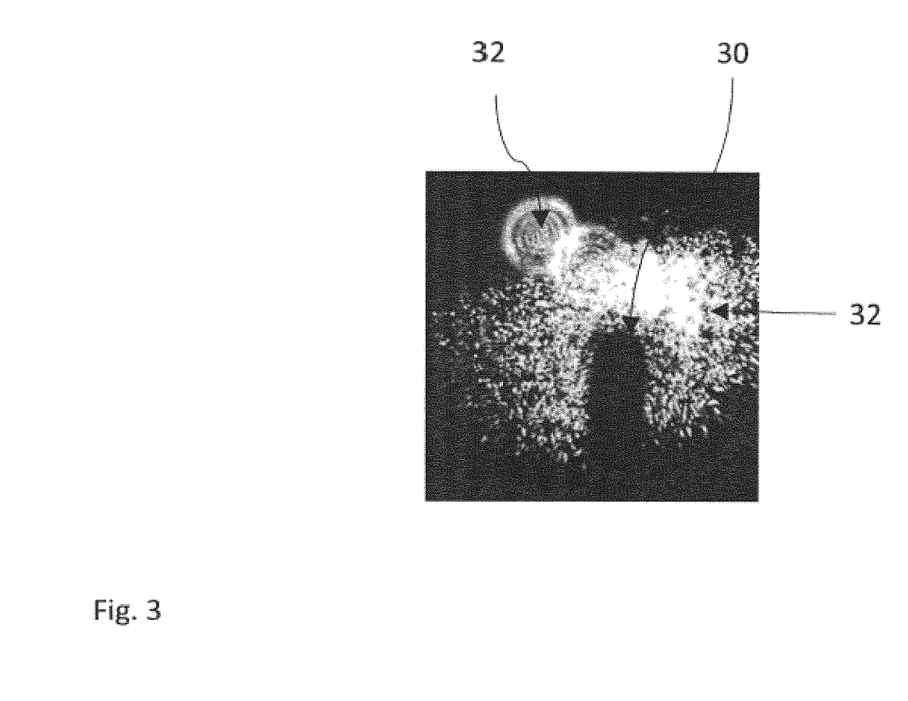
FIG. 3 shows an exemplary camera recording of a kerf with interfering reflections, which was obtained with a machining head structurally corresponding to the laser cutting head 10.

Typically, a 50:50 beam splitter is used as the beam splitter 16, which reflects 50% of the illuminating light and transmits 50%. A splitting of the illuminating light intensity into reflected and transmitted light is desirable, because initially the illuminating light is deflected at the beam splitter in the direction of the exit opening 12 and workpiece 24 and, after being reflected on the workpiece 24 and passing through the exit opening 12 again, is transmitted through the beam splitter 16 to the camera 14. With a 50:50 beam splitter, however, only a maximum of 25% of the emitted illuminating light can be used. When the illuminating light is deflected, 50% of the light is lost, and when the illuminating light is transmitted, another 50% is lost. The machining process is therefore monitored on the camera 14 with a low illumination light yield. Furthermore, undesired reflections of the illumination light beam can occur at boundary surfaces and at boundary layers on optical elements, for example of laser optics and shutters, as well as on other components of a machining head. FIG. 2 shows the laser cutting head 10 with an illumination light beam 28 and essential reflection points 29 of the laser cutting head 10, at which undesired reflections of the illumination light beam 28 typically arise. FIG. 3 shows an exemplary camera recording of a kerf 30 with such interfering reflections 32. However, the low illumination light yield at the camera and/or interfering reflections reduce the informative value of the camera recordings that are obtained during the monitoring of the machining process.

An exemplary laser optics is described in US 2006/0196860 A1, in which a rotatable machining laser beam is generated with two lambda/2 plates and a rotatable refraction optics there between. DE 102011119478 B4 proposes a coupling mirror for the illuminating light which is centrally reflective and peripherally transparent. Further optics of laser machining devices are described in US 2016/0193692 A1; DE 102018205545 A1; DE 102015121988 A1; US 2017/0043431 A1. EP 2886239 A1 relates to a method and a device for monitoring and regulating the machining path in a laser joining process. Above a dichroic beam splitter a polarization beam splitter and a λ/4 plate are installed. Illumination laser radiation diffusely scattered from the workpiece surface is circularly polarized and is transformed into linearly polarized radiation above the λ/4 plate and transmitted by the polarization beam splitter. However, interfering reflections of the illumination laser radiation may occur.

The object of the invention is to specify a machining head and a machining method that enable meaningful monitoring of the machining process.

This object is achieved with a machining head according to claim 1, a machining device according to claim 10, and a method for laser machining of a workpiece according to claim 11.

A first embodiment of the invention relates to a machining head for laser cutting of a workpiece, with a first interface for a machining laser source for emitting a machining laser beam; a second interface for an illumination light source for emitting a linearly polarised illumination light beam; an exit opening for the machining laser beam and the illumination light beam; a third interface for a detector device for detecting the illumination light beam reflected from the workpiece; and guide optics for at least partial coaxial guiding of the emitted illumination light beam through the exit opening and of the illumination light beam reflected from the workpiece through the exit opening to the third interface. Thus the guide optics show:
a polarising beam splitter for the guiding at least part of the emitted linearly polarised illumination light beam in the direction of the exit opening; and a retardation plate arranged between the polarising beam splitter and the exit opening for converting at least a portion of the emitted linearly polarised illumination light beam into a circularly polarised illumination light beam and for converting at least a portion of the circularly polarised illumination light beam reflected from the workpiece into a linearly polarised illumination light beam. The retardation plate is the optical element of the guide optics closest to the exit opening. In the guide optics at least one optical element for collimating and/or focusing the illumination light beam is positioned between the retardation plate and the polarising beam splitter. A machining laser optics arranged between guide optics and exit opening is provided.

Due to the combination of the polarising beam splitter and the retardation plate, the optical guide means that the polarisation of the illuminating light emitted by the illumination light source can be used advantageously. During operation of the machining head, up to 100% of the emitted illuminating light, i.e., 4 times more than with a 50:50 beam splitter, can be guided in the direction of the exit opening and ultimately used for detection and thus for monitoring the machining process. The illumination light yield for monitoring the process is therefore optimised. Another advantage is that interfering reflections are reduced. This is because the reflections of the emitted linearly polarised illuminating light between the illumination light source and the retardation plate do not change the linear polarisation of the emitted illuminating light. In the event of undesired reflections that can occur, the illuminating light is at worst returned to the illumination light source by the polarising beam splitter and does not interfere with the detector recordings. In addition, interference of the emitted and reflected illuminating light is avoided in the guide optics. In addition, commercially readily available, proven and inexpensive optical elements can be used.

The polarising beam splitter and the retardation plate can each be selective for a wavelength range, in particular for a wavelength range of the illumination light beam, in particular for a wavelength range around the wavelength of the illumination light beam. In this way, the illumination light yield at the detector device is increased.

The polarising beam splitter can be designed and/or aligned to deflect and/or reflect more than 90%, preferably between 90% and 100%, more preferably between 95% and 99%, of the linearly polarised illumination light beam in the direction of the retardation plate. The polarising beam splitter can also be designed and/or aligned to transmit at least a portion, in particular more than 80%, preferably between 80% and 100%, more preferably between 90% and 99%, of the illumination light reflected from the workpiece, in particular to transmit in direction of the third interface. This allows the optical elements of the guide optics to be arranged within a small space, since the polarising beam splitter can both deflect the illuminating light in the direction of the exit opening and transmit the reflected illuminating light in the direction of the third interface.

The retardation plate can be designed as a Quarter-wave plate. The retardation plate can also be designed and/or aligned to convert the emitted linearly polarised illumination light beam, in particular more than 90%, preferably between 90% and 100%, more preferably between 95% and 99% of the emitted linearly polarised illumination light beam, into a circularly polarised illumination light beam. The retardation plate can furthermore be designed and/or aligned to convert the circularly polarised illumination light beam reflected from the workpiece, in particular more than 90%, preferably between 90% and 100%, more preferably between 95% and 99% of the circularly polarised illumination light beam reflected from the workpiece, into a linearly polarised illumination light beam. In particular, the retardation plate can be designed to convert the reflected illumination light beam into a linearly polarised illumination light beam, the polarisation plane of which is perpendicular to the polarisation plane of the emitted linearly polarised illumination light beam. With these designs of the retardation plate, it is possible to minimise or exclude interference from the emitted and reflected illuminating light.

The first interface can be connected to or provided with a machining laser source for emitting a machining laser beam.

The second interface can be connected to or provided with an illumination light source for emitting a linearly polarised illumination light beam. The alignments of the illumination light source, the polarising beam splitter, and/or the retardation plate, in particular the respective rotational alignment thereof with respect to the central axis of the beam path of the illumination light beam, can be coordinated with one another. The tuning can in particular be carried out relative to the plane of polarisation of the emitted linearly polarised illumination light beam. The deflection of the emitted illumination light beam at the polarising beam splitter and/or the conversion of the emitted illumination light beam at the retardation plate can thus be optimised. At least one element selected from the second interface, the illumination light source, the polarising beam splitter and the retardation plate can be designed to be rotationally adjustable and/or rotatable, in particular with respect to the central axis of the beam path of the illumination light beam. For example, the rotational alignment of the polarising beam splitter is specified in relation to the central axis of the beam path of the illumination light beam, and the rotatory alignments of the illumination light source and the retardation plate are selected or adjusted, or are selected or adjusted in relation to the central axis of the beam path of the illumination light beam, such that the illumination light beam at the polarising beam splitter is at least partially deflected in the direction of the retardation plate and is at least partially converted by the retardation plate into a circularly polarised illumination light beam.

Furthermore, the third interface can be connected or provided with a detector device for detecting the illumination light beam reflected from the workpiece through the exit opening, in particular for detecting the illuminating light which is linearly polarised by the retardation plate. The retardation plate is the optical element of the guide optics closest to the exit opening. Furthermore, the guide optics can have at least one optical element for collimating and/or focusing the illumination light beam. In the guide optics at least one optical element for collimating and/or focusing the illumination light beam is positioned between the retardation plate and the polarising beam splitter. This allows, when the at least one optical element of the guide optics is set, e.g. adjusted, to sharply image the process light emitted by the machining zone and/or the illumination light reflected from the machining zone onto the detector device, to simultaneously direct, in particular focus and/or collimate, the illumination light beam onto the machining zone of the workpiece in an advantageous way. This allows synchrony of both imaging processes performed on the illumination light (directing onto the machining zone and imaging onto the detector device), a reduction of the number of optical elements needed for both imaging processes, and a cost saving as well as a space saving configuration of the guide optics within the machining head.

In addition, the guide optics can contain at least one shutter between the exit opening and the third interface. Machining laser optics arranged between guide optics and exit opening is provided. Furthermore, the guide optics and the machining laser optics can be designed for coaxially guiding the illuminating laser beam and the machining laser beam through the exit opening.

The exit opening and the third interface for the detector device can be arranged to be coaxial, in particular coaxial with respect to the direction of the incidence of the machining laser beam on the workpiece. The exit opening can also be circular and/or have a diameter of 0.8 to 6 mm.

Another embodiment relates to a machining device for laser machining of a workpiece, with a machining head according to one of the preceding embodiments.

Another embodiment provides a use of a machining head according to one of the preceding embodiments or a machining device according to the above embodiment for laser machining of a workpiece, in particular for laser cutting.

One embodiment relates to a method for laser cutting of a workpiece with a machining head or a machining device according to one of the preceding embodiments, with the steps: emitting a machining laser beam from a machining laser source at a first interface of a machining head and irradiating a workpiece, in particular a machining zone of the workpiece, with the machining laser beam through an exit opening of the machining head; emitting a linearly polarised illumination light beam from an illumination light source at a second interface of the machining head; guiding the emitted illumination light beam by means of guide optics of the machining head through the exit opening and illuminating the workpiece, in particular illuminating the machining zone, and guiding the illumination light beam reflected from the workpiece through the exit opening by means of the guide optics to a detector device at a third interface of the machining head, wherein the emitted and the reflected illumination light beam are guided at least partially coaxially; wherein the guide optics have a polarising beam splitter and a retardation plate arranged between the polarising beam splitter and the exit opening; by means of the polarising beam splitter, at least part of the emitted linearly polarised illumination light beam is guided in the direction of the exit opening, in particular in the direction of the retardation plate; and by means of the retardation plate, at least part of the emitted linearly polarised illumination light beam is converted into a circularly polarised illumination light beam and at least a part of the circularly polarised illumination light beam reflected from the workpiece is converted into a linearly polarised illumination light beam. At least one optical element of the guide optics, which is positioned between the retardation plate and the polarising beam splitter, collimates and/or focusses the emitted linearly polarised illumination light beam and the converted linearly polarised illumination light beam.

In the method, the polarising beam splitter and the retardation plate can each be selectively selected or adjusted for a wavelength range, in particular for a wavelength range of the illumination light beam, in particular for a wavelength range around the wavelength of the illumination light beam.

Furthermore, in the method, the polarising beam splitter can deflect and/or reflect more than 90%, preferably between 90% and 100%, more preferably between 95% and 99%, of the linearly polarised illumination light beam in the direction of the retardation plate. In addition, the polarising beam splitter can transmit at least part, in particular more than 80%, preferably between 80% and 100%, more preferably between 90% and 99%, of the illumination light reflected from the workpiece, in particular in the direction of the third interface. Furthermore, the polarising beam splitter can be aligned in the direction of the retardation plate for deflecting and/or reflecting the emitted linearly polarised illumination light beam. Alternatively or additionally, the illumination light source can be aligned for deflecting and/or reflecting the linearly polarised illumination light beam by means of the polarising beam splitter in the direction of the retardation plate. Furthermore, the polarising beam splitter can be aligned for transmitting the illuminating light reflected from the workpiece through the polarising beam splitter.

In the method, a Quarter-wave plate can be selected as the retardation plate. In addition, more than 90%, preferably between 90% and 100%, more preferably between 95% and 99%, of the emitted linearly polarised illumination light beam can be converted into a circularly polarised illumination light beam by the retardation plate. In particular, the retardation plate can be aligned to convert more than 90% of the emitted linearly polarised illumination light beam into a circularly polarised illumination light beam. In addition, by means of the retardation plate, more than 90%, preferably between 90% and 100%, more preferably between 95% and 99%, of the circularly polarised illumination light beam reflected by the workpiece can be converted into a linearly polarised illumination light beam, in particular into a linearly polarised illumination light beam, the plane of polarisation of which is perpendicular to the plane of polarisation of the emitted linearly polarised illumination light beam. The retardation plate can be aligned to convert more than 90% of the circularly polarised illumination light beam reflected from the workpiece into a linearly polarised illumination light beam.

The method can further include: machining the workpiece with the machining laser beam; and/or detecting, with the detector device, at least a part of the illumination light beam reflected from the workpiece through the exit opening, in particular at least a part of the circularly polarised illumination light beam reflected from the workpiece and converted with the retardation plate into a linearly polarised illumination light beam. In the method, at least one optical element of the guide optics, which is positioned between the retardation plate and the polarising beam splitter, can be set, e.g. adjusted, to sharply image at least a part of the process light emitted by the workpiece and/or at least a part of the converted linearly polarised illumination light beam onto the detector device. Thereby the emitted linearly polarised illumination light beam can be simultaneously directed, in particular focussed and/or collimated, onto the machining zone of the workpiece.

With the devices for laser machining of a workpiece of the above embodiments, the same advantages and functions can be realised as with the embodiments of the method for laser machining of a workpiece, in particular with identical and/or analogous features.

Further features and efficiencies arise from the following description of exemplary embodiments, the figures and the dependent claims. The above-mentioned features and those described below can be used without departing from the scope of the present invention not only in the respective combinations indicated, but also in other combinations or in isolation.

The invention is explained in more detail below on the basis of exemplary embodiments with reference to the accompanying drawings, which likewise disclose features that are essential to the invention. These exemplary embodiments are used for illustration purposes only and are not to be construed as limiting. For example, a description of an exemplary embodiment with a large number of elements or components should not be interpreted to the effect that all of these elements or components are necessary for implementation. Rather, other exemplary embodiments can also contain alternative elements and components, fewer elements or components, or additional elements or components. Elements or components of different exemplary embodiments can be combined with one another, unless otherwise stated.

Modifications and variations which are described for one of the exemplary embodiments can also be applied to other exemplary embodiments. To avoid repetition, elements that are the same or that correspond to one another are denoted by the same reference symbols in different figures and are not explained more than once. The figures show.

In the following, in the case of described value ranges, it is understood that the specification of a broad range with narrower alternative or preferred ranges also discloses ranges that can be formed by any arbitrary combination of specified lower range limits and specified upper range limits. The term "emitted" illuminating light or "emitted" illumination light beam and modifications thereof refer to the illuminating light or the illumination light beam after being emitted from the illumination light source all the way to the workpiece. The term "reflected" illuminating light or "reflected" illumination light beam and modifications thereof refer to the illuminating light or the illumination light beam after reflection on the workpiece all the way to the third interface or to the detector device.

Figure 4A:
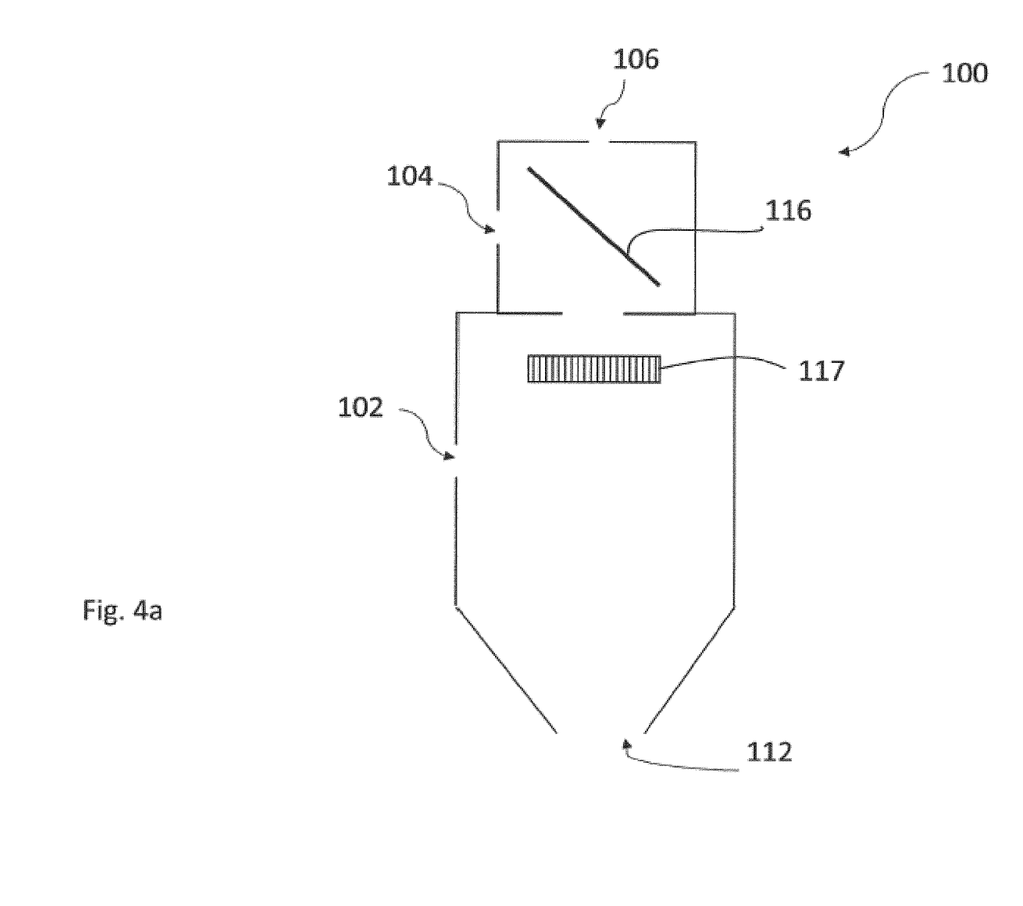
FIG. 4a schematically shows a machining head 100 for laser machining of a workpiece.
Figure 4B:
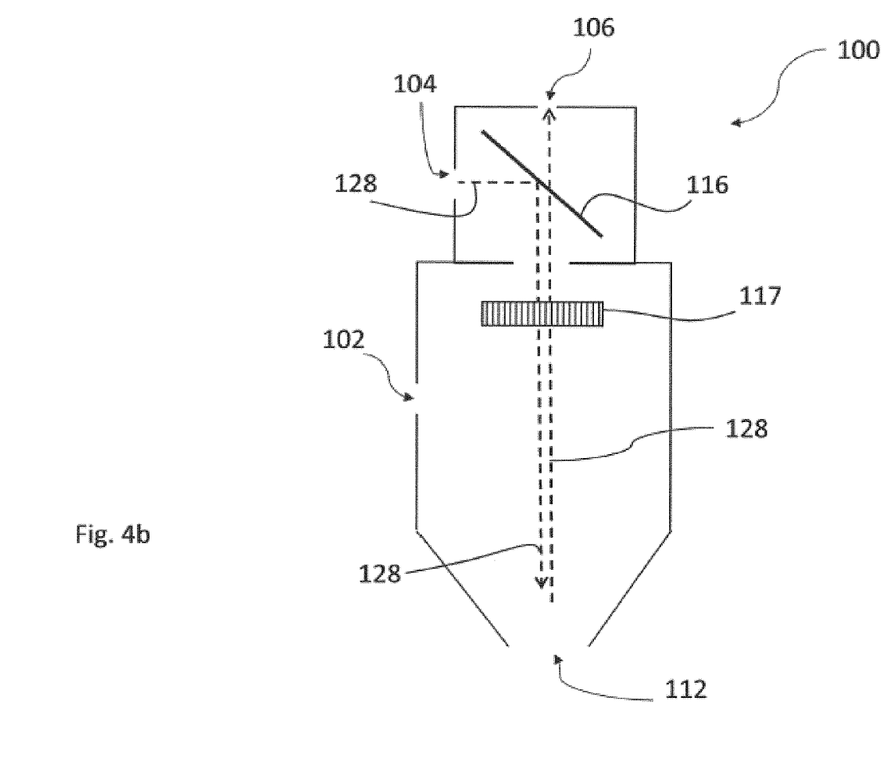
FIG. 4b schematically shows a machining head 100 for laser machining of a workpiece while the illumination light source is in operation.

FIGS. 4a and 4b show, as an exemplary embodiment of the invention, a machining head 100 for laser machining of a workpiece. The machining head is provided with a first interface 102 for a machining laser source for emitting a machining laser beam (not shown); a second interface 104 for an illumination light source for emitting a linearly polarised illumination light beam 128; an exit opening 112 for the machining laser beam and the illumination light beam; a third interface 106 for a detector device for detecting the illumination light beam reflected from the workpiece; and guide optics 116, 117 for at least partial coaxial guiding of the emitted illumination light beam through the exit opening and the illumination light beam reflected from the workpiece through the exit opening to the third interface. The illumination light beam 128 generated during operation is illustrated in FIG. 4b with a dashed line. The guide optics have the following: a polarising beam splitter 116 for guiding of at least part of the emitted linearly polarised illumination light beam in the direction of the exit opening 112; and a retardation plate 117 arranged between the polarising beam splitter 116 and the exit opening 112 for converting at least part of the emitted linearly polarised illumination light beam into a circularly polarised illumination light beam and for converting at least a part of the circularly polarised illumination light beam reflected from the workpiece into a linearly polarised illumination light beam.

Figure 5:
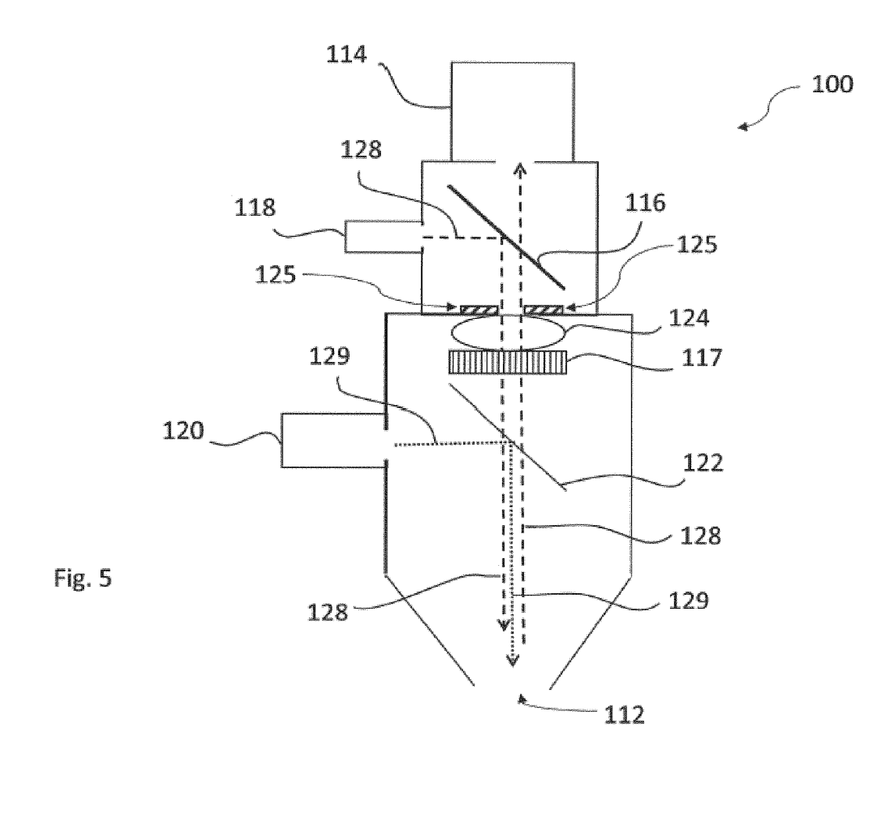
FIG. 5 schematically shows the machining head 100 with a machining laser source 120, a dichroic mirror 122, an illumination light source 118 and a detector device 114 during operation of the illumination light source and the machining laser source.

FIG. 5 shows the machining head 100 with a machining laser source 120 provided at the first interface 102, a dichroic mirror 122 for deflecting the machining laser beam 129, an illumination light source 118 attached to the second interface 104, and a camera 114 attached to the third interface 106 as a detector device. In the present example, a monochromatic CMOS camera is used which is sensitive to a wavelength range from 400 to 800 nm. In front of the camera 114, i.e., at the third interface 106, a narrow-band filter is provided with passband filtering around the central illumination wavelength. In addition, a lens 124 for the illumination light beam is shown as an optional optical element, for example a focusing lens or a collimation lens, which in the present example is positioned between the retardation plate 117 and the polarising beam splitter 116. Another optional element can be a shutter 125. For example, the shutter 125 can be arranged above the lens 124, as shown in FIG. 5, or at the third interface 106. A shutter (narrowing) can be advantageous with regard to the depth of field of the camera recordings.

In an alternative example, the camera 114 can be provided at the second interface 104 and the illumination light source 118 can be provided at the third interface 106, i.e., the camera 114 and the illumination light source 118 are interchanged in comparison with the example of FIG. 5. In this case, the polarising beam splitter 116 is aligned such that it is transmissive for the illumination light beam 128 emitted from the source 118 and reflective for the illumination light beam 128 reflected on the workpiece 24. The polarising beam splitter thus allows the emitted illumination light beam 128 to pass at least partially in the direction of the exit opening 112 and at least partially deflects the illumination light beam 128 reflected on the workpiece 24 to the camera 114.

To machine the workpiece, in the example in FIG. 5, the machining laser source 120 and the illumination light source 118 are put into operation and the machining laser beam 129 (shown with a dashed line in FIG. 5) and the illumination light beam 128 are guided laterally into the machining head 100. By means of the polarising beam splitter 116 or by means of the dichroic mirror 122, which is transparent to the illumination light beam, the emitted illumination light beam 128 and the machining laser beam are deflected and guided coaxially to the exit opening 112. The illumination light beam reflected from the workpiece through the exit opening 112 is guided coaxially with the machining laser beam and the illumination light beam to the camera 114.

If the machining head 100 is used, for example, in a cutting process, a narrow-band illumination with simultaneous filtering of the detected wavelength is beneficial for optimal camera recording conditions during the cutting process. In this way, a high level of information can be obtained, particularly with regard to the kerf geometry. Through the placement of the illumination light source and guidance of the illumination light, illumination can be carried out through the exit opening 112. For good illumination of the process zone and the highest possible illumination light yield, parallel beam propagation of the illumination light is also beneficial, which can be achieved with a collimation lens as the optical element 124. The optical element 124 can alternatively be a focusing lens that is adjustable and can be used to focus the camera on the process zone. If the illumination light source 118 and the camera 114 are approximately the same distance from the process zone, as in the example in FIG. 5, a similar focusing can advantageously be achieved for both by means of the focusing lens 124.

The machining laser source 120 in the present example has a power of approximately 12 kW and generates the machining laser beam having a central wavelength of 1070 nm. A narrow-band and spatially directed light source, in the present example a diode laser, also called a laser diode, is used as the illumination light source 118. This sends out linearly polarised light. In the present example, the illumination light source 118 is operated with a power of approximately 1000 mW and generates the illuminating laser beam 128 with a central wavelength of approximately 638 nm, with a wavelength band of 6 nm. Alternatively, illumination light sources can be used which generate a linearly polarised laser beam in a wavelength range from 400 to 1000 nm. The power of the illumination light source can be adjustable. Depending on the power of the machining laser source and/or the nature of the workpiece, different illumination powers can be advantageous. For example, the illumination light source can be adjustable between approx. 100 and 2000 mW. In further alternatives, light sources with a downstream polariser can also be used. In the present example, the polarisation direction of the illumination light beam 128 emitted by the diode laser is the s-polarisation.

The polarising beam splitter 116 is formed from a dielectric material and is commercially available. Linearly polarised light is released in a single plane (of light propagation) and reflects the light in the plane (of light propagation) orthogonal thereto. This mode of operation is wavelength-selective. In the present case, the polarising beam splitter 116 is selected such that it has the described mode of operation in the wavelength range specified by the diode laser. The beam splitter 116 is installed and rotationally aligned with respect to the central axis of the beam path of the illumination light beam 128 and relative to the plane of polarisation of the illumination light beam 128, such that approximately 100% of the emitted s-polarised illuminating light is reflected at the beam splitter in the direction of the exit opening 112.

A Quarter-wave plate made of birefringent crystalline quartz is provided for the present example as the retardation plate 117 arranged between the polarising beam splitter 116 and the exit opening 112. In the present example, the Quarter-wave plate 117 is also the optical element of the guide optics that is closest to the exit opening 112. In this way, the Quarter-wave plate 117 is installed after optional further imaging optics of the guide optics, such as the lens 124 shown in FIG. 5, and after boundary surfaces of the guide optics. The Quarter-wave plate is installed in such a way that the emitted s-polarised illuminating light passing through the Quarter-wave plate is converted into circularly polarised illuminating light.

The Quarter-wave plate belongs to the component group of optical retardation plates or waveplates. In general, such optical components can change the polarisation and phase of electromagnetic waves passing through, in particular light. This makes use of the fact that light propagates with different wavelengths in suitably oriented birefringent material, depending on the position of the polarisation plane.

In the present example, the Quarter-wave plate 117 is selected and arranged in such a way that the linear polarisation of the impinging emitted s-polarised illumination light beam 128 is converted into a left-circular polarisation. The Quarter-wave plate 117 is rotationally aligned with respect to the central axis of the beam path of the illumination light beam 128 and relative to the plane of polarisation of the impinging emitted illumination light beam so that approximately 100% of the linearly s-polarised illuminating light is transmitted and is converted into left-circularly polarised illuminating light. The mode of operation of the Quarter-wave plate is wavelength-selective. In the present example, the lambda plate 116 is matched to the wavelength range specified by the diode laser.

Figure 6A:
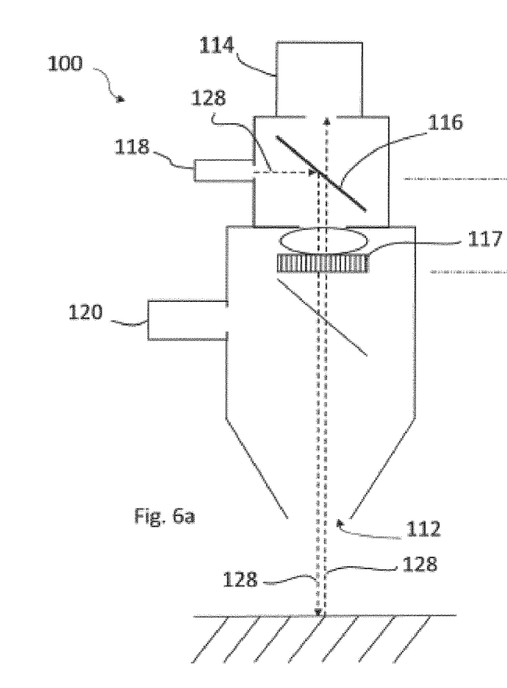
FIG. 6a, b schematically show the machining head 100 during operation of the illumination light source.
Figure 6B:
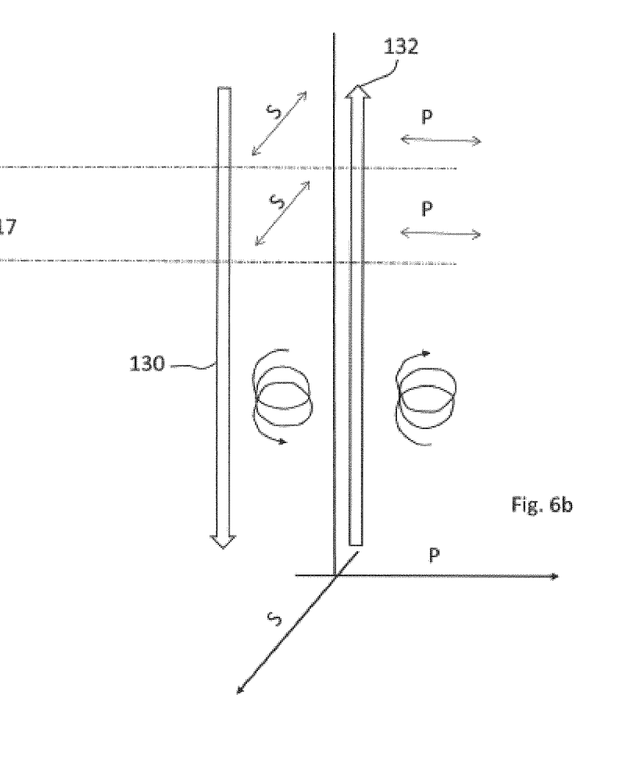

As shown schematically in FIGS. 6a and 6b, when the machining head 100 is in operation, the s-polarised illumination light beam 128 emitted by the illumination light source 118 is approximately 100% reflected and deflected at the polarising beam splitter 116 in the direction of the Quarter-wave plate 117 and the exit opening 112. The Quarter-wave plate 117 converts approximately 100% of the s-polarisation of the illumination light beam 128 into a circular polarisation, in the present example into a left circular polarisation. The left circularly polarised illumination light beam 128 propagates further through the exit opening 112 to the workpiece 24. The illumination light beam 128 is reflected there, wherein a circular polarisation is retained, only the direction of the left circular polarisation is changed to right circular.

The Quarter-wave plate 117 is designed and aligned in such a way that approximately 100% of the transmitted right circularly polarised illuminating light is converted into p-polarised light. Furthermore, the beam splitter 116 is designed and aligned in such a way that at least 80% of the impinging p-polarised illuminating light is transmitted.

On the way back, the illumination light beam 128 reflected by the workpiece 24 again passes through the Quarter-wave plate 117, the right circular polarisation thereof being converted into a linear polarisation. The plane of polarisation of the linearly polarised illumination light beam 128 is now perpendicular to the plane of polarisation of the emitted linearly polarised illuminating beam 128. The linear polarisation of the emitted illumination light beam 128 in the direction of propagation in front of the Quarter-wave plate 117 is an s-polarisation in the present example. Correspondingly, the orthogonal (perpendicular) linear polarisation is the p-polarisation. The illumination light beam 128 reflected by the workpiece and transmitted through the Quarter-wave plate is thus p-polarised. The polarising beam splitter 116 is at least 80% transparent for the p-polarised illumination light beam 128.

For illustration, FIG. 6b shows schematically how the polarisation states change along the beam path of the illumination light beam 128. The direction of propagation of the illumination light beam 128 to the workpiece 24 is shown with the arrow 130. The arrow 132 corresponds to the direction of propagation of the illumination light beam 128 reflected from the workpiece to the camera 114. In the direction of propagation 130, the illumination light beam 128 is s-polarised between the illumination light source 118 and the Quarter-wave plate 117. After passing through the Quarter-wave plate 117, the illumination light beam 128 is polarised in a left-circular manner in the direction of propagation 130. After reflection on the workpiece 24, the illumination light beam 128 is polarised in a right-circular manner in the direction of propagation 132. After passing through the Quarter-wave plate 117, the illumination light beam 128 is p-polarised, passes the polarising beam splitter 116 in the direction of propagation 132 and finally reaches the camera 114.

Since almost 100% of the emitted illumination light beam is deflected at the polarising beam splitter 116, almost 100% of the emitted or reflected illumination light beam is converted by the Quarter-wave plate 117, and more than 80% of the reflected illumination light beam is transmitted at the beam splitter 116 to the camera 114, so that a high proportion, for example 80% to 100%, of the illumination light beam 128 originally generated with the illumination light source 118 can be used for monitoring the machining process. The illumination light yield for monitoring the machining process is therefore maximised with the machining head 100.

In the present example, the fact that the Quarter-wave plate 117 is installed in the beam path of the emitted illumination light beam 128 as the last optical element of the optical guide means that the monitoring of the machining process is highly meaningful. Thus, the Quarter-wave plate 117, in cooperation with the polarising beam splitter 116, enables interfering reflections from optical interfaces of the emitted s-polarised illumination light beam in the direction of the camera 114 to be avoided. If interfering reflections of the illumination light beam 128 occur between the illumination light source 118 and the Quarter-wave plate 117, the polarisation thereof is not changed. However, reflections of the s-polarised illuminating light are not transmitted by the polarising beam splitter 116, but rather are reflected and thus do not reach the camera 114.

In addition, due to the guide optics with the polarising beam splitter 116 and the Quarter-wave plate 117, interference of the emitted and reflected illuminating light is avoided. Since the polarisation of the illumination light beam 128 is different in the direction of propagation 130 and in the direction of propagation 132 (s or p polarisation and right/left circular), these rays only interfere minimally or interference is avoided.

LIST OF REFERENCE SYMBOLS

10 Laser cutting head
12 Exit opening
14 Camera
16 Beam splitter
18 Illumination light source
20 Machining laser source
22 Dichroic mirror
24 Workpiece
28 Illumination light beam
29 Reflection points
30 Kerf
32 Reflection
100 Machining head
102 First interface
104 Second interface
106 Third interface
112 Exit opening
114 Detector device, camera
116 Polarising beam splitter
117 Retardation plate, Quarter-wave plate
118 Illumination light source, diode laser
120 Machining laser source
122 Dichroic mirror
124 Lens, optical element
125 Shutter
128 Illumination light beam
129 Machining laser beam
130 Arrow, direction of propagation
132 Arrow, direction of propagation

The invention claimed is:

1. A machining head for laser cutting of a workpiece, comprising:
a first interface for a machining laser source for emitting a machining laser beam;
a second interface for an illumination light source for emitting a linearly polarised illumination light beam;
an exit opening for the machining laser beam and the illumination light beam;
a third interface for a detector device for detecting the illumination light beam reflected from the workpiece; and
guide optics for at least partial coaxial guiding of the emitted illumination light beam through the exit opening and of the illumination light beam reflected from the workpiece, through the exit opening, to the third interface;
the guide optics including
a polarising beam splitter for guiding at least part of the emitted linearly polarised illumination light beam in a direction of the exit opening; and
a retardation plate arranged between the polarising beam splitter and the exit opening, for converting at least a portion of the emitted linearly polarised illumination light beam into a circularly polarised illumination light beam and for converting at least a portion of the circularly polarised illumination light beam reflected from the workpiece into a linearly polarised illumination light beam;
wherein a machining laser optics is arranged between the guide optics and the exit opening;
wherein
the retardation plate is an optical element of the guide optics closest to the exit opening; and
the guide optics further includes at least one optical element for collimating and/or focusing the illumination light beam is positioned between the retardation plate and the polarising beam splitter.

2. The machining head according to claim 1, wherein the second interface is connected to or provided with an illumination light source for emitting a linearly polarised illumination light beam.

3. The machining head according to claim 2, wherein the polarising beam splitter and the retardation plate are each selective for a wavelength range of the illumination light beam.

4. The machining head according to claim 2,
wherein the polarising beam splitter is designed and/or aligned for deflecting and/or reflecting more than 90% of the linearly polarised illumination light beam in a direction of the retardation plate; and/or
wherein the polarising beam splitter is designed and/or aligned to transmit at least a part of the illuminating light reflected from the workpiece.

5. The machining head according to claim 1, wherein the retardation plate is configured as a Quarter-wave plate.

6. The machining head according to claim 2,
wherein the retardation plate is designed and/or aligned for converting the emitted linearly polarised illumination light beam into a circularly polarised illumination light beam; and/or
wherein the retardation plate is designed and/or aligned for converting the circularly polarised illumination light beam reflected from the workpiece into a linearly polarised illumination light beam;
wherein the retardation plate is designed and/or aligned for converting a polarisation plane that is perpendicular to a polarisation plane of the emitted linearly polarised illumination light beam into the linearly polarised illumination light beam.

7. The machining head according to claim 1,
wherein the first interface is connected to or provided with a machining laser source for emitting a machining laser beam; and/or
wherein the third interface is connected or provided with a detector device for detecting the illumination light beam reflected from the workpiece through the exit opening.

8. The machining head according to claim 1, wherein the guide optics and the machining laser optics are configured to guide the illuminating laser beam and the machining laser beam coaxially through the exit opening.

9. The machining head according to claim 1,
wherein the exit opening and the third interface for the detector device are arranged to be coaxial with respect to a direction of an incidence of the machining laser beam on the workpiece; and/or
wherein the exit opening is formed to be circular and/or has a diameter of 0.8 to 6 mm.

10. A machining device for laser cutting of a workpiece, having a machining head according to claim 1.

11. A method for laser cutting of a workpiece with a machining head according to claim 1, comprising:
emitting a machining laser beam from a machining laser source at a first interface of a machining head and irradiating a machining zone of a workpiece with the machining laser beam through an exit opening of the machining head;
emitting a linearly polarised illumination light beam from an illumination light source at a second interface of the machining head;
guiding the emitted illumination light beam by the guide optics of the machining head through the exit opening and illuminating the machining zone of the workpiece, and guiding the illumination light beam reflected from the workpiece through the exit opening by the guide optics to a detector device at a third interface of the machining head, wherein the emitted and the reflected illumination light beam are guided at least partially coaxially;
wherein the guide optics include a polarising beam splitter and a retardation plate arranged between the polarising beam splitter and the exit opening;
wherein, by the polarising beam splitter, at least part of the emitted linearly polarised illumination light beam is guided in a direction of the exit opening, and in a direction of the retardation plate; and
wherein, by the retardation plate, at least part of the emitted linearly polarised illumination light beam is converted into a circularly polarised illumination light beam and at least a part of the circularly polarised illumination light beam reflected from the workpiece is converted into a linearly polarised illumination light beam;
wherein at least one optical element of the guide optics, which is positioned between the retardation plate and the polarising beam splitter, collimates and/or focusses the emitted linearly polarised illumination light beam and the converted linearly polarised illumination light beam.

12. The method according to claim 11,
wherein the polarising beam splitter and the retardation plate are each selectively selected or adjusted for a wavelength range of the illumination light beam and/or for a wavelength range around a wavelength of the illumination light beam.

13. The method according to claim 11,
wherein the polarising beam splitter deflects and/or reflects more than 90% of the linearly polarised illumination light beam in a direction of the retardation plate; and/or
wherein the polarising beam splitter transmits more than 80%, of the illumination light reflected by the workpiece in a direction of the third interface.

14. The method according to claim 11,
wherein a Quarter-wave plate is selected as the retardation plate; and/or
wherein the retardation plate converts more than 90% of the emitted linearly polarised illumination light beam into a circularly polarised illumination light beam; and/or
wherein the retardation plate converts more than 90% of the circularly polarised illumination light beam reflected from the workpiece into a linearly polarised illumination light beam, wherein a plane of polarisation of the linearly polarised illumination light beam is perpendicular to a plane of polarisation of the emitted linearly polarised illumination light beam.

15. The method according to claim 11, further comprising machining of the workpiece with the machining laser beam; and/or
detecting, with the detector device, at least a part of the illumination light beam reflected from the workpiece through the exit opening which is reflected from the workpiece and converted with the retardation plate into the linearly polarised illumination light beam; and/or
wherein at least one optical element of the guide optics, which is positioned between the retardation plate and the polarising beam splitter, is set to sharply image at least a part of a process light emitted by the workpiece and/or at least a part of the converted linearly polarised illumination light beam onto the detector device, whereby the emitted linearly polarised illumination light beam is simultaneously directed, focussed, and/or collimated, onto the machining zone of the workpiece.

16. The machining head according to claim 3, wherein the wavelength range is around the wavelength of the illumination beam.

17. The machining head according to claim 4, wherein the polarising beam splitter is designed and/or aligned to transmit more than 80% of the illuminating light reflected from the workpiece in the direction of the third interface.

18. The machining head according to claim 6, wherein the retardation plate is designed and/or aligned for converting more than 90% of the emitted linearly polarised illumination light beam into a circularly polarised illumination light beam; and/or
wherein the retardation plate is designed and/or aligned for converting more than 90% of the circularly polarised illumination light beam reflected from the workpiece into a linearly polarised illumination light beam.

19. The machining head according to claim 7, wherein the detector device is configured for detecting the illuminating light linearly polarised by the retardation plate.

20. The method of claim 15, further comprising detecting at least a part of the circularly polarised illumination light beam which is reflected from the workpiece and converted with the retardation plate into the linearly polarised illumination light beam.

* * * * *